(12) United States Patent
Natanasigamani et al.

(10) Patent No.: US 7,630,278 B2
(45) Date of Patent: Dec. 8, 2009

(54) FOCUSING CONTROL METHOD FOR READING/WRITING OPTICAL DISC

(75) Inventors: Balakumaran Natanasigamani, Eindhoven (NL); Jos Berckmans, Eindhoven (NL); Maarten Kuijper, Eindhoven (NL)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 415 days.

(21) Appl. No.: 11/755,552

(22) Filed: May 30, 2007

(65) Prior Publication Data

US 2008/0298209 A1   Dec. 4, 2008

(51) Int. Cl.
*G11B 7/00* (2006.01)

(52) U.S. Cl. .............. 369/44.25; 369/44.29; 369/44.35; 369/44.32; 369/112.23; 369/112.02

(58) Field of Classification Search .................. None
See application file for complete search history.

(56) References Cited

U.S. PATENT DOCUMENTS

| | | | |
|---|---|---|---|
| 7,215,606 B2 * | 5/2007 | Yonezawa | 369/44.29 |
| 2003/0202437 A1 * | 10/2003 | Yamada et al. | 369/44.29 |
| 2004/0136281 A1 * | 7/2004 | Yanagisawa et al. | 369/44.32 |

* cited by examiner

*Primary Examiner*—Muhammad N. Edun
(74) *Attorney, Agent, or Firm*—WPAT., P.C.; Justin King

(57) ABSTRACT

An optical reading/writing apparatus has an optical head that includes a collimator and a lens. For efficient and reliable focusing control for writing an empty optical disk, calibration of focus offset and spherical aberration is executed by setting a boundary and performing data-reading in an OPC area only with combinations of focus offset and spherical aberration within the boundary. Accordingly, an optimum combination of focus offset and spherical aberration is determined for focusing compensation in subsequent writing operation of the empty disk.

12 Claims, 6 Drawing Sheets

FOCUSING CONTROL METHOD FOR READING/WRITING OPTICAL DISC

FIELD OF THE INVENTION

The present invention relates to a focusing control method, and more particularly to a focusing control method for reading/writing an optical disc.

BACKGROUND OF THE INVENTION

For reading/writing data from/to an optical disc, the optical head is moved in two directions, i.e. a direction perpendicular to the disc face, which is referred to as a focusing direction, and a direction parallel to the disc face, which is referred to as a tracking direction. Meanwhile, the light emitted by a light source such as a laser diode is focused by an object lens of the optical head on the optical disc, and the light reflected by the optical disc is transmitted to a light sensor to extract data. According to the obtained data, a focusing error signal and a tracking error signal can be realized for further adjusting the movement of the optical head in the focusing direction and the tracking direction.

To find the perfect focusing position by using the focusing error signal, a variety of methods such as astigmatic method, spot-size method, Foucault method, etc. can be employed for focusing control. Hereinafter, an astigmatic method is described in more detail as a focusing control example for better understanding. For implementing the astigmatic method, the optical sensor of an optical disc drive includes four light receiving parts A, B, C and D for respectively receiving the main beam reflected from the disc, as can be seen in any of FIGS. 1A~1C. The summation of the light intensities reflected from the receiving parts A, B, C and D is defined as a data signal HF=A+B+C+D. During a tracking operation, a radial push-pull signal PP=(A+B)−(C+D) is generated. On the other hand, as far as a focusing operation is concerned, the focusing error signal FE is substantially a difference between the summation of the overall light intensity received by the receiving parts A and C and the summation of the overall light intensity received by the receiving parts B and D, i.e. (A+C)−(B+D), where A, B, C and D are light intensities received by the regions A, B, C and D, respectively. FIGS. 1A~1C illustrate three kinds of focusing results. When the light emitted by the light source is perfectly focused on the desired point, as shown in FIG. 1B, the overall light intensity received by the receiving parts B and D will be equal to that the overall light intensity received by the receiving parts A and C, i.e. FE=(A+C)−(B+D)=0. In another case shown in FIG. 1A, the value of (A+C)−(B+D) is minus, which indicates a focusing position above the perfect position. On the other hand, in the case shown in FIG. 1C, the positive value of (A+C)−(B+D) indicates a focusing position below the perfect position. The relationship between the voltage of the focusing error signal FE and the depth of the focusing position (or the distance of the focusing position from the lens), which is so-called as "S-curve", is illustrated in FIG. 1D. The astigmatic method is performed in a closed-loop focusing control manner to zero the focusing error signal FE, thereby locating the perfect focusing position.

Due to the spherical shape of the lens of an optical head, the focusing of the lens would be less than ideal. Therefore, spherical aberration, which is some kind of image imperfection that occurs due to the increased refraction of the laser rays that occurs when rays strike the lens near its edge, would be rendered. To remedy the spherical aberration, a collimator is introduced upstream of a lens of the optical head to filter the rays so that only those traveling parallel to a specified direction can pass through.

For compensating spherical aberration as well as focusing offset, a collimator is combined with a lens to be included in an optical head of an optical reading/writing apparatus such as a CD, DVD, Blu-ray and HD-DVD. Please refer to FIG. 2 which schematically exemplifies the laser rays emitted by a laser diode 20 and processed by a collimator 21 and a lens 22 to be well focused on an optical disc 23. As shown, parallel laser rays are obtained through the collimator 21 so as to be precisely focused on the optical disc 23 by the lens 22.

Due to the introduction of collimator 21, one-dimensional compensation is insufficient for locating the optimal focusing position of the optical head. Accordingly, the collimator 21 and lens 32 are both adjusted in a two-dimensional manner to locate the optimum focusing position on the optical disc 23. With the movement of the collimator 21 and lens 22, the summation of the overall light intensities received by the receiving parts A, B, C and D of the optical head changes. Thus the data signal HF is generated and a jitter of the data signal HF-jitter is obtained.

For a written disk, the calibration of the focus offset and spherical aberration can be performed based on the data having been present in the disk. On the other hand, for an empty optical disk that includes no data thereon, calibration of focusing offset and spherical aberration can be performed with the information recorded in the blank optical disk during the OPC (Optimum Power Calibration) procedure. OPC is a function of an optical disk recording/reproducing apparatus that checks and calculates a proper writing power and reflection of an optical disk in use so as to make proper adjustments for writing the optical disk. With the determined optimum power, a few tracks are written in a drive calibration zone on the disk (normally OPC-area). Since there has been written information on this area, focus offset and spherical aberration can be calibrated based on the HF-jitter. Then an optimum combination of focus offset and spherical aberration resulting in the best writing quality, e.g. the lowest HF jitter, is used for compensation in subsequent reading/writing operations.

The above calibration method, however, has some drawbacks. In practice, the HF-jitter is expressed as a function of spherical aberration relevant to the position change of the collimator and focusing offset relevant to the position change of the lens. Usually, the algorithm repeatedly changes the focusing offset until a sufficient wide dynamic range is found containing or predicting the optimum value. Sometimes the focusing offset is set to such a large value that the servo loses focus. That invokes a focusing recovery. With too many recoveries, focusing offset optimization would fail. Also with a too large focus-offset normal playback and recording become unacceptably unstable. Therefore, these recoveries should be prevented as much as possible. Aside from, as the sample quantity of the information recorded in the OPC area during the OPC procedure is not enough for completing the calibration of the focusing offset and spherical aberration, the optical head with the lens and collimator need be moved to and forth to obtain sufficient information. The calibration process is not efficient.

SUMMARY OF THE INVENTION

Therefore, the present invention provides a focusing control method with efficient focus offset and spherical aberration calibration.

The present invention relates to a focusing control method for use in an optical reading/writing apparatus to write an optical disc. The optical reading/writing apparatus has an optical head that includes a collimator and a lens. The focusing control method includes steps of: executing an open-loop tracking procedure with a plurality of position combinations of the collimator and the lens to generate a first signal changing with a plurality of combinations of focus offset and spherical aberration; setting a boundary for selecting combinations among the plurality of combinations of focus offset and spherical aberration according to the first signal; determining an optimum combination of focus offset and spherical aberration within the boundary according to data recorded in a data area; and executing read/write operations of the optical disc with the compensation of the optimum combination of focus offset and spherical aberration.

In an embodiment, the first signal is a radial error signal. For example, the radial error signal is a push-pull signal indicating push-pull amplitudes corresponding to the plurality of combinations of focus offset and spherical aberration, respectively. The push-pill amplitudes less than a threshold are defined to be within the boundary.

In an embodiment, the first signal is a wobble signal indicating wobble amplitudes corresponding to the plurality of combinations of focus offset and spherical aberration, respectively. The wobble amplitudes greater than a threshold are defined to be within the boundary.

In an embodiment, the data recorded in the data area are read and compensated with the combinations of focus offset and spherical aberration within the boundary in a closed-loop manner to generate a plurality of data signals. One of the combinations resulting in the lowest jitter of the data signals is determined to be the optimum combination.

In an embodiment, the optical disk is an empty optical disc, and the data area is an optimum power calibration (OPC) area defined by executing an OPC procedure.

In an embodiment, the optical disk is previously written with data, and the first signal is selected from a group consisting of a wobble signal, a push-pull signal and a jitter signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

When reading/writing an optical disk, focus offset and spherical aberration compensation is necessary for obtaining good reading/writing quality. Calibration of the focus offset and spherical aberration is thus critical. For achieving efficient and reliable calibration, a cost function is introduced to extract optimum combinations of focus offset and spherical aberration in advance according to the present invention.

Figure 1A:
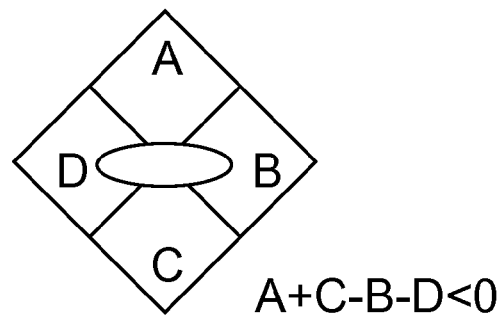
FIGS. 1A, 1B and 1C are diagrams schematically illustrating three possible situations of a focusing error signal FE generated according to an astigmatic method.
Figure 1B:
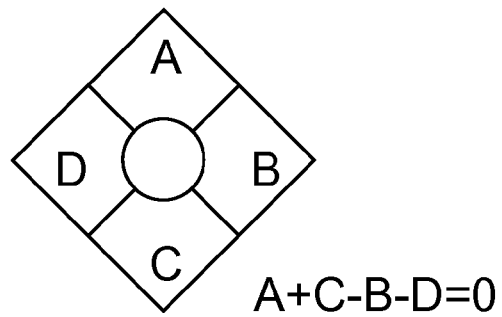
Figure 1C:
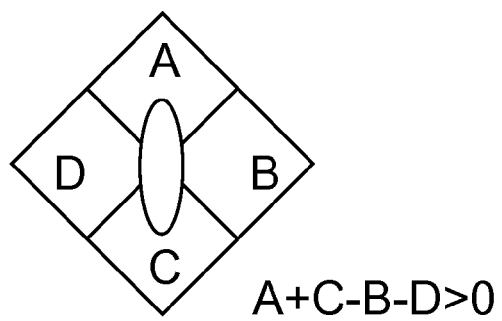
Figure 1D:
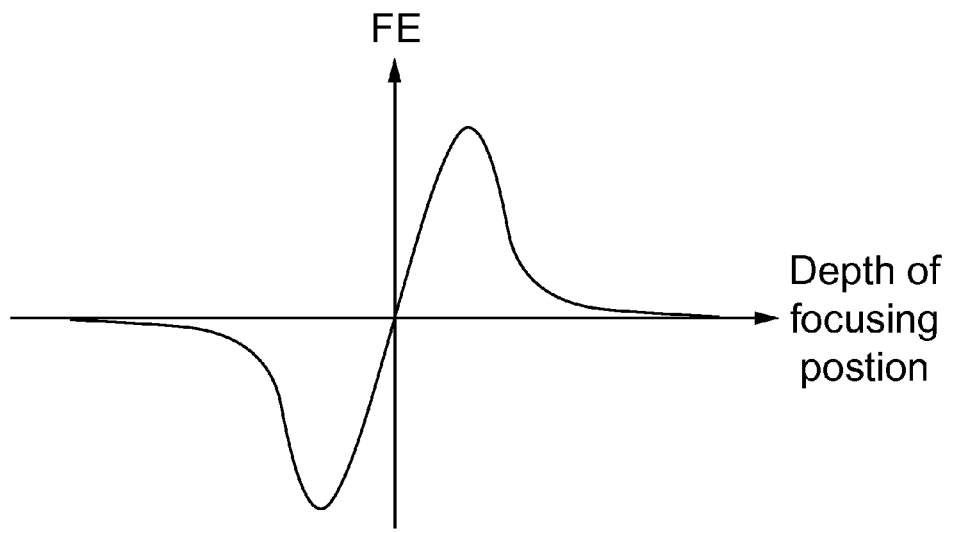
FIG. 1D is a waveform diagram schematically illustrating focusing error signal FE variations with focusing positions (S-curve) when focusing on a single-layer disc according to the astigmatic method.
Figure 2:
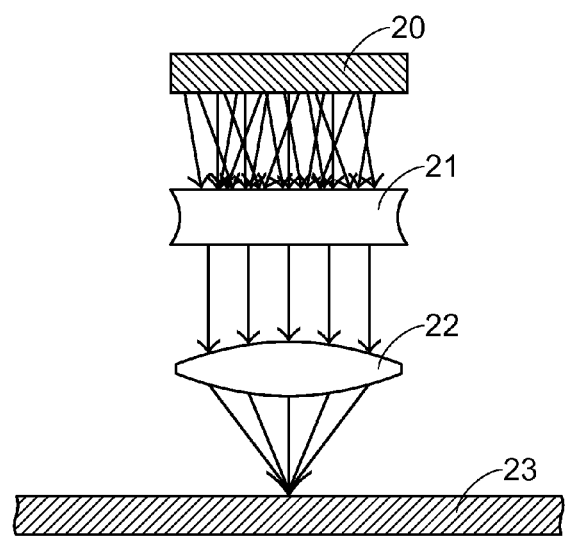
FIG. 2 is a schematic diagram showing the means for processing laser rays according to the present invention.
Figure 3A:
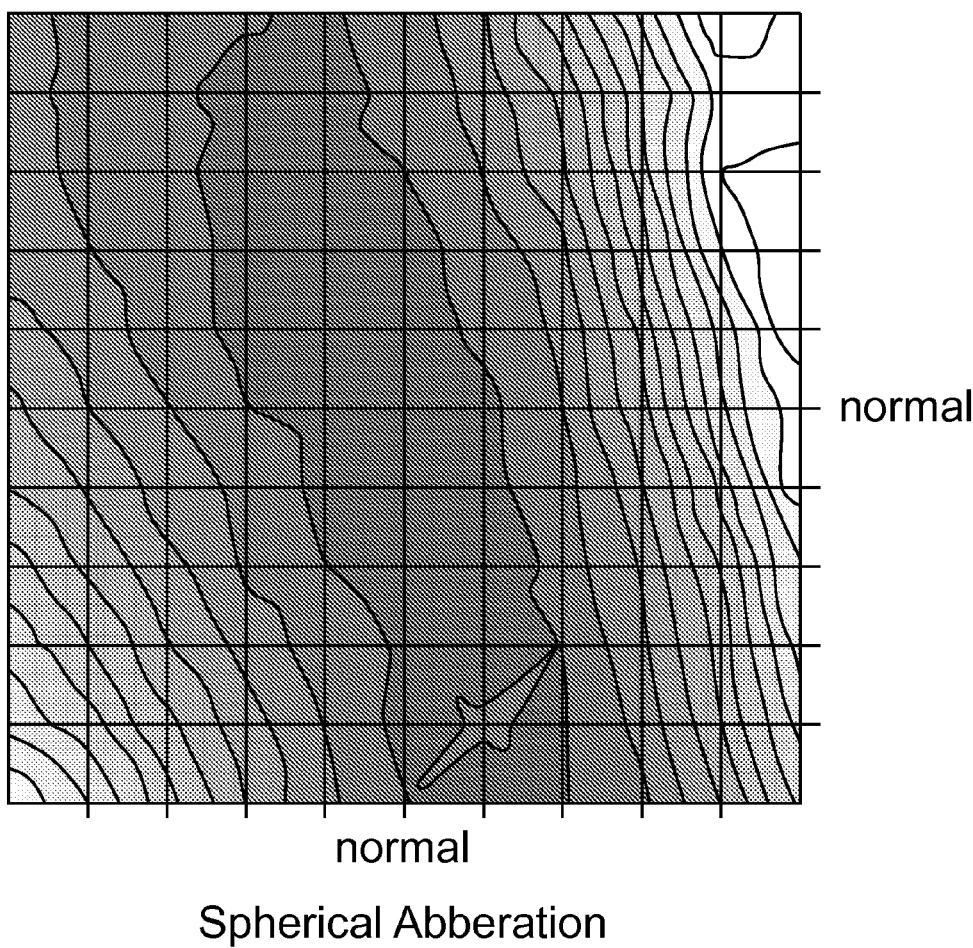
FIG. 3A is a contour diagram illustrating exemplified jitter measurement correlating to focusing offset and spherical aberration.
Figure 3B:
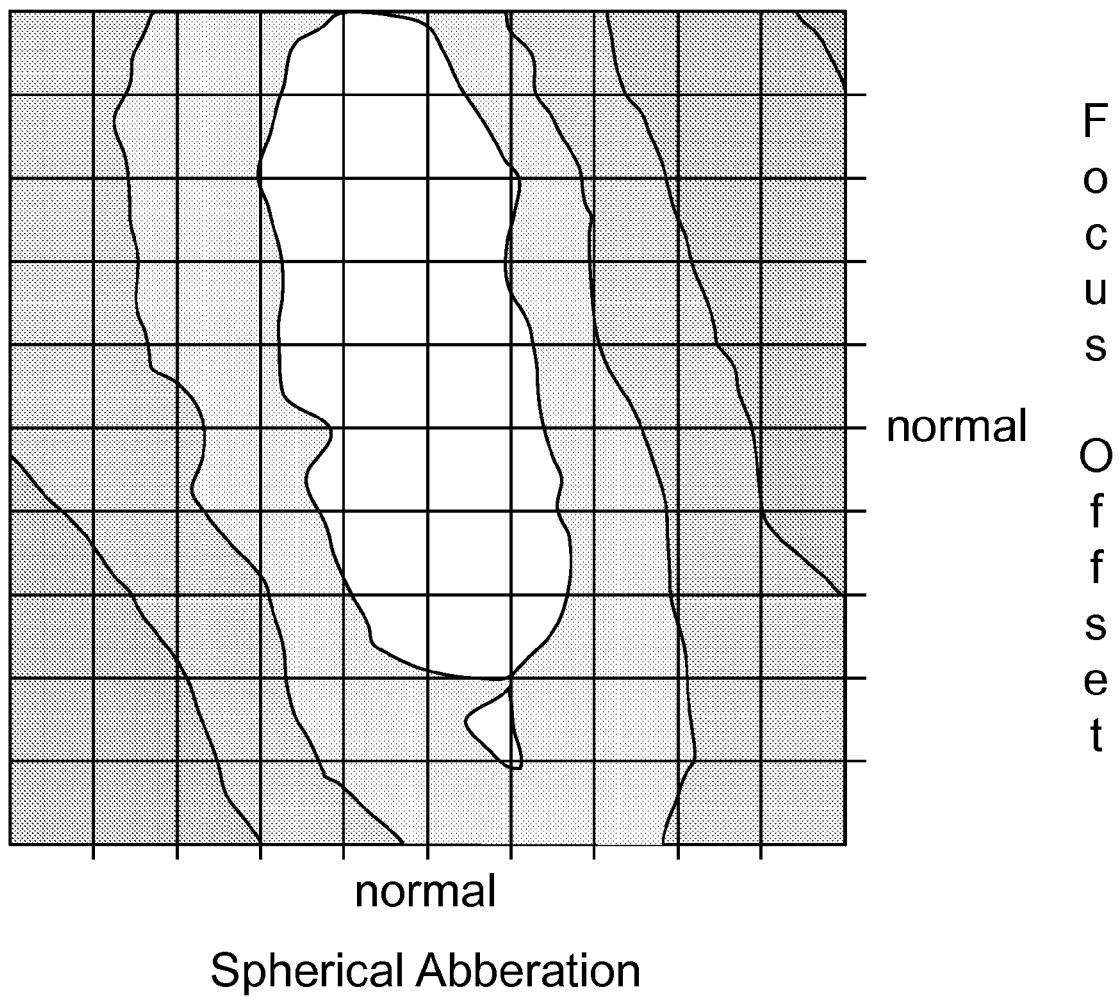
FIG. 3B is a contour diagram illustrating exemplified wobble amplitude measurement correlating to focusing offset and spherical aberration.
Figure 3C:
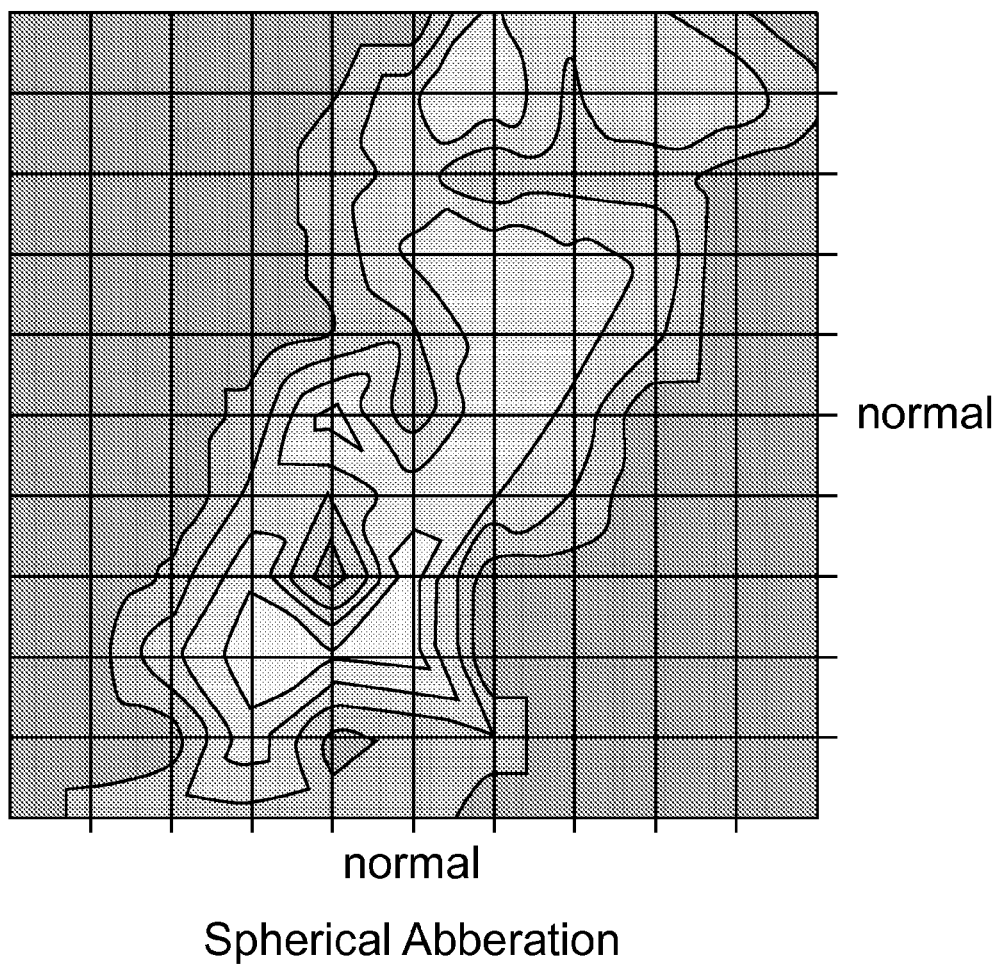
FIG. 3C is a contour diagram illustrating exemplified push-pull amplitude measurement correlating to focusing offset and spherical aberration.

Please refer to FIGS. 3A~3C. A signal specific to the inherent feature of an optical disk, e.g. a wobble signal (FIG. 3B) or a push-pull signal (FIG. 3C), shows an acceptable correlation with the HF-jitter optimization (FIG. 3A). Furthermore, the wobble amplitude has a clear correlation with the wobble read out quality, and the push-pull amplitude has a clear correlation with the servo tracking stability as for example indicated by the seek performance indicator "actuator steps per seek" or indicator "radial recoveries per seek". Therefore, an embodiment of the present invention uses such signals as the cost function for locating optimum combinations of focus offset and spherical aberration of an optical disk.

Figure 4:
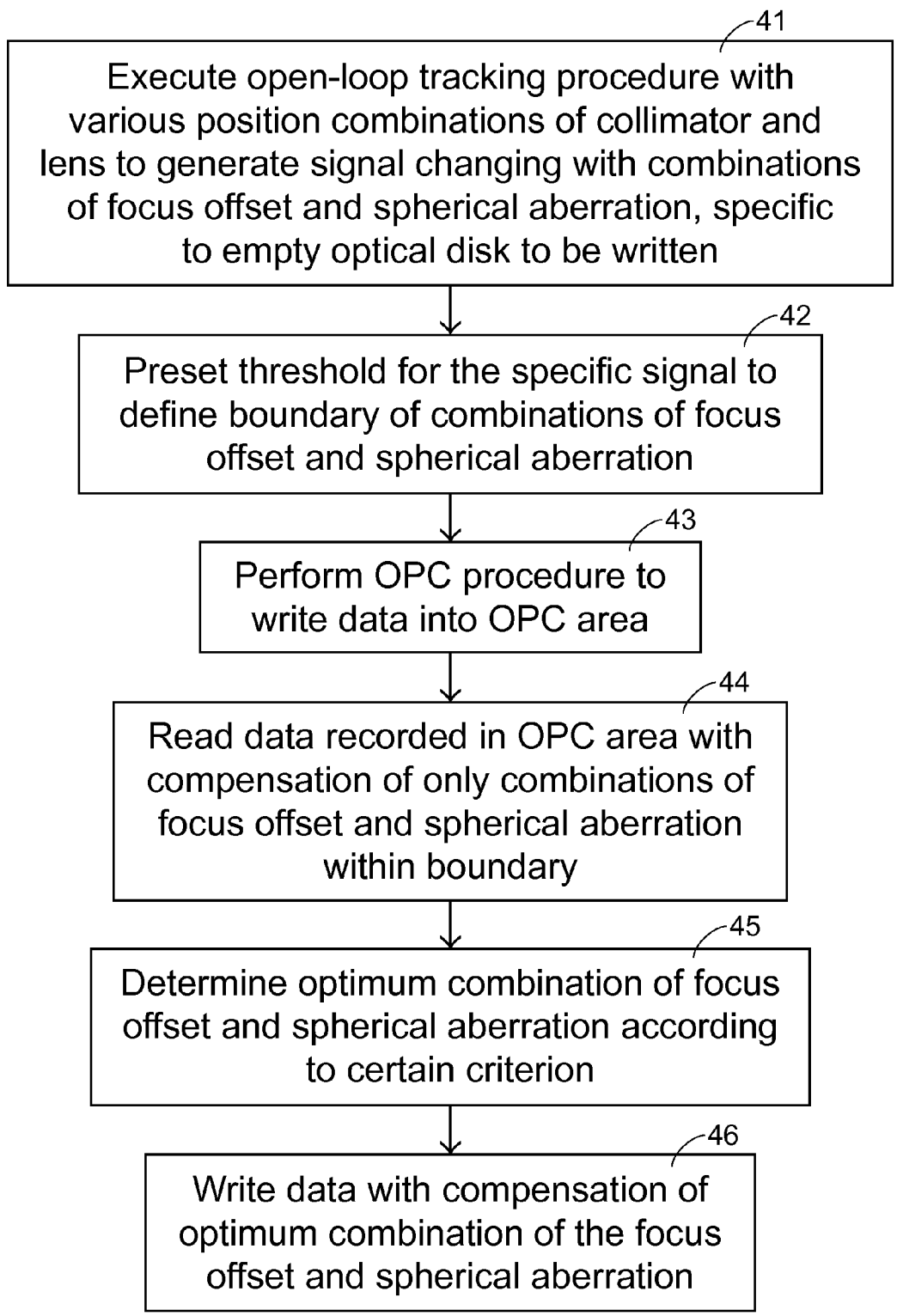
FIG. 4 is a flowchart illustrating a focusing control method according to an embodiment of the present invention.

Please refer to the flowchart of FIG. 4, in which a focus control method for writing an empty disk is illustrated. First of all, an open-loop tracking procedure is executed with a plurality of position combinations of the collimator and the lens to generate a specific signal changing with a plurality of combinations of focus offset and spherical aberration (Step 41). For example, the collimator is first fixed at a preset position with normal spherical aberration while moving the lens to a plurality of preset positions around normal focusing offset, then the collimator is moved to next preset position accompanied by the movement of the lens to those preset positions, and so on. Alternatively, it can be the lens fixed at a preset position with normal focusing offset first while moving the collimator to a plurality of preset positions around normal spherical aberration, and then likewise, the lens is moved to next preset position with the collimator moving to those preset position, and so on. The normal positions of the collimator and the lens can be information preset in the apparatus, e.g. at the middle point of the movable range, or obtained in a startup procedure, e.g. with minimum focusing offset and spherical aberration.

The specific signal, for example, can be a wobble signal indicating wobble amplitudes corresponding to the plurality of combinations of focus offset and spherical aberration, as illustrated in FIG. 3B. By presetting a threshold, wobble amplitudes less than the threshold are disregarded so as to define a boundary (Step 42). In another example, the specific signal can be a radial error signal such as a push-pull signal indicating push-pull amplitudes corresponding to the plurality of combinations of focus offset and spherical aberration, as illustrated in FIG. 3C, and push-pull amplitudes higher than the threshold are disregarded so as to define a boundary. An optimum power calibration (OPC) procedure is then performed to write data into some designated tracks, which is referred to as an OPC area (Step 43). Only the combinations of focus offset and spherical aberration within the boundary are used to read data recorded in the OPC area (Step 44). The resulting data signals are compared according to a certain criterion, e.g. HF-jitter. One of the combinations of focus offset and spherical aberration within the boundary, e.g. the one resulting in a data signal with the lowest jitter, is determined to be the optimum combination (Step 45). Subsequent writing operations of the optical disc are then executed with the compensation of the optimum combination of focus offset and spherical aberration (Step 46).

In this way, the recovery problems can be eliminated and the focusing precision on a high-capacity optical disc such as BD-R or BD-RE disc can be enhanced so as to improve the writing performance. Moreover, the calibration of the focus offset and spherical aberration for an empty optical disk can made in an efficient way.

The present invention can also be applied to the calibration of focus offset and spherical aberration for reading a written optical disk. Since there have been data present in the optical disk, a jitter signal indicative of jitters of a data signal can be used instead of the wobble signal or push-pull signal to define the boundary.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims, e.g. different systems than those described above, like for example the Foucault or knife-edge method and spot-size method. In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

What is claimed is:

1. A focusing control method for use in an optical reading/writing apparatus to read/write an optical disc, the optical reading/writing apparatus having an optical head that includes a collimator and a lens, and the focusing control method comprising steps of:

executing an open-loop tracking procedure with a plurality of position combinations of the collimator and the lens to generate a first signal changing with a plurality of combinations of focus offset and spherical aberration;

setting a boundary for selecting combinations among the plurality of combinations of focus offset and spherical aberration according to the first signal;

determining an optimum combination of focus offset and spherical aberration within the boundary according to data recorded in a data area; and executing read/write operations of the optical disc with the compensation of the optimum combination of focus offset and spherical aberration.

2. The method according to claim 1 wherein the first signal is a radial error signal.

3. The method according to claim 2 wherein the radial error signal is a push-pull signal indicating push-pull amplitudes corresponding to the plurality of combinations of focus offset and spherical aberration, respectively.

4. The method according to claim 3 wherein the push-pill amplitudes less than a threshold are defined to be within the boundary.

5. The method according to claim 1 wherein the first signal is a wobble signal indicating wobble amplitudes corresponding to the plurality of combinations of focus offset and spherical aberration, respectively.

6. The method according to claim 3 wherein the wobble amplitudes greater than a threshold are defined to be within the boundary.

7. The method according to claim 1 wherein the data recorded in the data area are read and compensated with the combinations of focus offset and spherical aberration within the boundary in a closed-loop manner to generate a plurality of data signals.

8. The method according to claim 7 wherein one of the combinations resulting in the lowest jitter of the data signals is determined to be the optimum combination.

9. The method according to claim 1 wherein the data area is an optimum power calibration (OPC) area defined by executing an OPC procedure.

10. The method according to claim 9 wherein the optical disk is an empty optical disc.

11. The method according to claim 1 wherein the optical disk is previously written with data.

12. The method according to claim 11 wherein the first signal is selected from a group consisting of a wobble signal, a push-pull signal and a jitter signal.

* * * * *